April 1, 1952     A. B. CAMPBELL     2,591,402
TIMING MOVEMENT
Filed Oct. 26, 1949
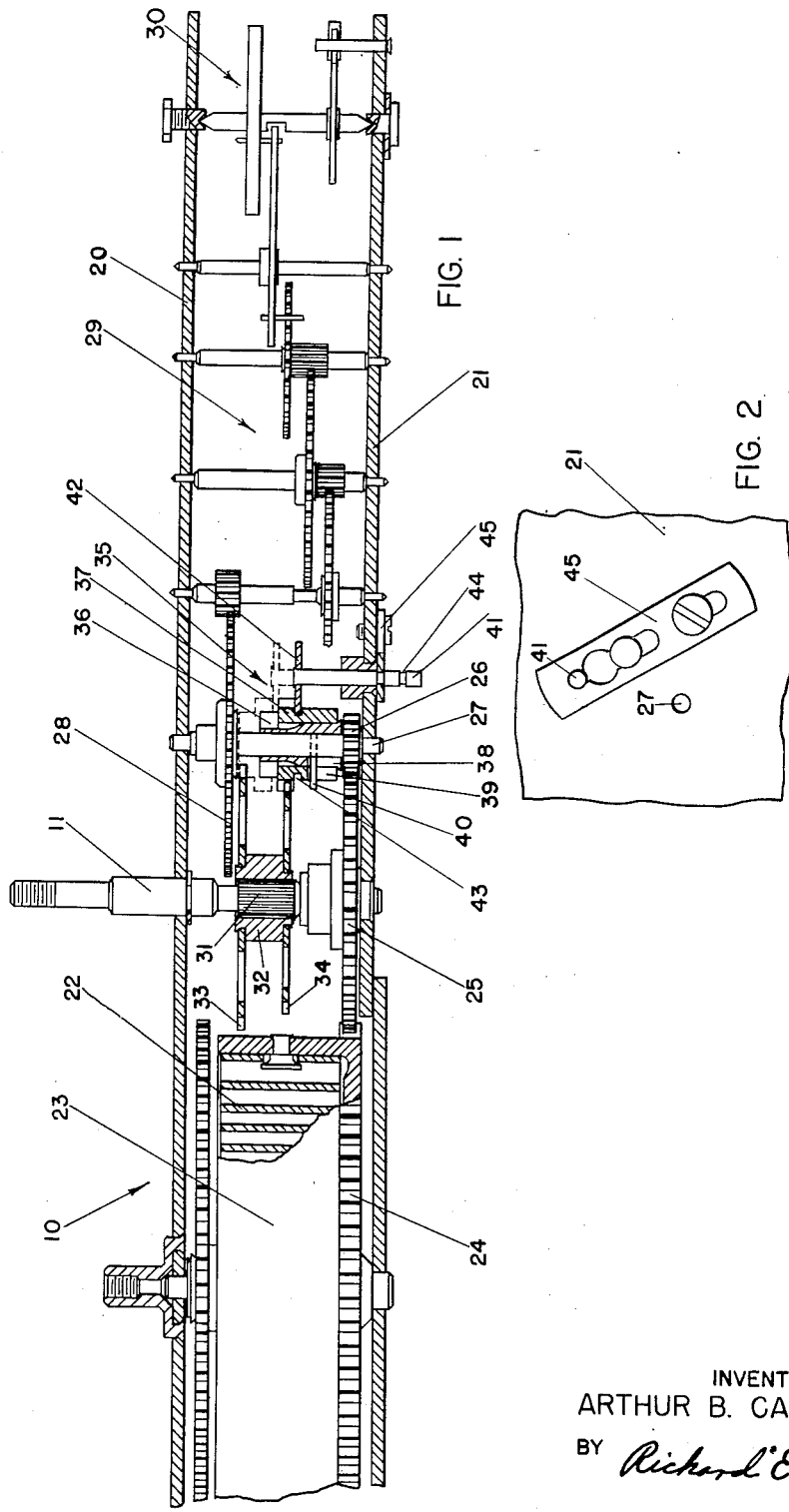
INVENTOR
ARTHUR B. CAMPBELL
BY Richard E. Burn
ATTORNEY Patented Apr. 1, 1952

2,591,402

UNITED STATES PATENT OFFICE 2,591,402

TIMING MOVEMENT

Arthur B. Campbell, La Salle, Ill., assignor to General Time Corporation, New York, N. Y., a corporation of Delaware Application October 26, 1949, Serial No. 123,707

2 Claims. (Cl. 161—15)

1

This invention relates to a timing movement and more particularly to a timing movement for driving an indicator at any predetermined one of a plurality of speeds. The movement is particularly designed for parking meters so that the movement can be used, for example, in a meter indicating one hour of parking time for a nickel, or the same movement may be used to drive a meter indicating two hours of parking time for a nickel. A parking meter of the general type with which this movement may be used is disclosed in McGay Patent No. 2,284,221, issued May 26, 1942.

In many cities it is customary to provide parking meters with a higher rate, for example, one hour for five cents in the downtown area and meters with a lower rate of two hours for five cents in outlying areas. Prior to my invention, it has been necessary to stock a different model movement for each rate described.

It is an object of my invention to provide a time movement wherein the operator may, by a simple adjustment, vary the indicator speed.

A second object of my invention is to provide a time movement for a parking meter whereby a single movement may be used in either of two types of meters having two different time indications for the same coin.

Still another object is to provide a time movement in which the operator has a choice of speeds from the indicator or output shaft, that will be simple and economical to manufacture and will cost little more than a single speed movement.

Other objects will be apparent to those skilled in the art from the disclosure of a preferred embodiment which follows, read in conjunction with the appended drawings in which:

Fig. 1 is a schematic view partially in cross-section showing the time movement; and Fig. 2 is an elevational view showing the gear assembly shift lock.

As shown in Fig. 1, the time movement 10 is mounted between plates 20 and 21. The shaft 11, hereinafter referred to as the indicator shaft, is adapted to be positioned in a parking meter in a manner similar to shaft 11 of the McGay patent identified above.

Shaft 11 is adapted to support an indicator or pointer 13 shown in said McGay patent. The motive power for the movement is furnished by a mainspring 22 which turns a spring barrel 23 having on its periphery a gear 24. Gear 24 drives gear 25 which is freely rotatable on indicator shaft 11. Gear 25 in turn drives gear 26 fixed to a shaft 27 and through said shaft also drives gear 28 which is secured to the opposite end of shaft 27. Gear 28 through conventional reduction gearing 29 drives an escapement 30 that controls the rate at which the spring 23 and the gearing connected thereto is allowed to turn.

The indicator shaft 11 is driven from shaft 27 through a novel sliding transmission so that the operator may choose the speed at which the indicator shaft will turn. A portion 31 of shaft 11 is splined. A collar 32 is frictionally secured to the splined position and two gears 33 and 34 are, in turn, affixed to said collar and spaced apart by the same. Both gears 33 and 34 have the same number of teeth but gear 33 has a larger diameter than 34, as shown in the drawing.

Cooperating with gears 33 and 34 is movable gear assembly 35 which comprises gears 36 and 37. Gear 36 is slidably mounted on shaft 27. It has a long shank provided with a slot 38. Gear 37 having a similar slot 39 in its shank is mounted on the shank of gear 36. A pin 40 driven into shaft 27 through both of slots 38 and 39 provides a means to rotate both gears 36 and 37 by shaft 27 and yet allows said gears to slide longitudinally on the shaft.

In the lower position of the gear assembly 35 (as shown in Fig. 1) gear 37 meshes with gear 34 thereby driving indicator shaft 11. In the upper position gear 36 meshes with gear 33 and gears 34 and 37 are disengaged. In the present embodiment gear 36 has eight teeth and gear 37 has sixteen. Since gears 33 and 34 have the same number of teeth, the indicator shaft turns twice as fast with gear 37 driving gear 34 as it does when gear 36 drives gear 33.

Means are provided for shifting the gear assembly including a shaft 41 that is slidably mounted in plate 21. A disc 42 affixed to one end of this shaft is fitted in a groove 43 in the shank of gear 37. In the portion of shaft 41 extending beyond plate 21 are cut two grooves 44. These grooves cooperate with a sliding latch 45 so that the gear assembly 35 may be locked in either of two positions with either gear 36 or gear 37 in engagement.

It will be seen, therefore, that the supplying agency need stock only one parking meter movement to service either one hour or two hour meters. In order to set the movement for the correct output speed, the operator loosens the screw holding latch 45 and slides the latch in the upward position so that shaft 41 is free to move axially. He then moves the gear assembly 35 by means of shaft 41 until the proper gears are meshed.

The above description of a preferred embodi-

What is claimed is:

1. A timing movement comprising a spring driven barrel, a first shaft adapted to be rotated by said barrel, a gear affixed to said shaft and connected through gearing to an escapement for controlling the speed of rotation of said shaft, a gear assembly including two gears, one having a different number of teeth from the other, one mounted on the shank of the other and each having a slot in its shank, a pin passing through said slots and into said first shaft so that said gear assembly is axially slidable on said shaft but rotatable with said shaft, means to slide said gear assembly from a first position to a second position, an indicator shaft mounted parallel to said first shaft, two gears affixed to said indicator shaft and adapted to mesh with one of the gears in said gear assembly when it is in said first position and the other adapted to mesh with the other gear of said assembly when it is in said second position, and means to shift and lock said assembly in either the first or second position.

2. In a parking meter having an elapsed time indicator a timing movement comprising a mainspring, reduction gearing driven by said mainspring, an escapement driven by said gearing and in turn controlling the speed at which said gearing is driven, means to connect said indicator to said gearing including an indicator shaft, two gears having different diameters but the same number of teeth secured to said shaft and spaced axially from each other and a slidable gear assembly cooperating with said gears including two gears having different diameters and different numbers of teeth, one gear adapted to be engaged with one of the indicator shaft gears and one with the other of the indicator shaft gears whereby said indicator may be driven at either one of two speeds.

ARTHUR B. CAMPBELL.

REFERENCES CITED

The following references are of record in the file of this patent:

UNITED STATES PATENTS

| Number | Name | Date |
| --- | --- | --- |
| 1,973,275 | Babson | Sept. 11, 1934 |
| 2,284,221 | McGay | May 26, 1942 |